United States Patent
Rynerson

(10) Patent No.: US 12,380,483 B2
(45) Date of Patent: Aug. 5, 2025

(54) COMPUTER PLATFORM AND MOBILE APPLICATION FOR SERVICES PROVIDER SEARCHING OVER A NETWORK

(71) Applicant: Graciella Kowalczyk Rynerson, Franklin, TN (US)

(72) Inventor: Graciella Kowalczyk Rynerson, Franklin, TN (US)

(*) Notice: Subject to any disclaimer, the term of this patent is extended or adjusted under 35 U.S.C. 154(b) by 1063 days.

(21) Appl. No.: 16/949,831

(22) Filed: Nov. 16, 2020

(65) Prior Publication Data

US 2021/0150607 A1 May 20, 2021

Related U.S. Application Data

(60) Provisional application No. 62/935,148, filed on Nov. 14, 2019.

(51) Int. Cl.
| | |
|---|---|
| *G06Q 30/0601* | (2023.01) |
| *G06F 16/951* | (2019.01) |
| *G06F 16/9535* | (2019.01) |
| *G06F 16/9537* | (2019.01) |
| *G06F 16/9538* | (2019.01) |

(52) U.S. Cl.
CPC ....... *G06Q 30/0629* (2013.01); *G06F 16/951* (2019.01); *G06F 16/9535* (2019.01); *G06F 16/9537* (2019.01); *G06F 16/9538* (2019.01)

(58) Field of Classification Search
None
See application file for complete search history.

(56) References Cited

U.S. PATENT DOCUMENTS

| | | | | |
|---|---|---|---|---|
| 2010/0174587 A1* | 7/2010 | Seidman | ........ | G06Q 10/063112 705/347 |
| 2014/0142973 A1* | 5/2014 | Henley | .............. | G06Q 30/0277 705/2 |
| 2016/0034305 A1* | 2/2016 | Shear | .................... | G06F 16/285 707/722 |

FOREIGN PATENT DOCUMENTS

EP  3660855 A1 *  6/2020 ........... A01K 29/005

OTHER PUBLICATIONS

P. Patel and S. Chaudhary, "Context Aware Semantic Service Discovery," 2009 World Conference on Services—II, Bangalore, India , 2009, pp. 1-8, doi: 10.1109/SERVICES-2.2009.19. (Year: 2009).*

* cited by examiner

*Primary Examiner* — Michelle T Kringen
(74) *Attorney, Agent, or Firm* — Holland & Knight LLP

(57) ABSTRACT

A system may include a first computing device, a second computing device, or a server in data communication with the first computing device and the second computing device over a data network. The server may be configured to receive first user data from the first computing device; store the first user data in a first database; receive first provider data from the second computing device; store the first provider data in a second database receive first provider search data from the first computing device; select at least a portion of the plurality of provider data from the second database; and send search response data based on the selected portion of the plurality of provider data to the first computing device. An apparatus and method embodying some of the functionality of the system are also disclosed.

20 Claims, 9 Drawing Sheets

| Username | Password Hash | Name | Email | Address |
|---|---|---|---|---|
| Anna12 | ***** | Anna Smith | asmith@email.com | 123 Main Street |
| Bobby7 | ***** | Bob Jones | bjones@email.com | 585 Oak Street |
| Chris8 | ***** | Chris Dell | chrisd@email.com | 22 Walnut Avenue |

FIG. 2A

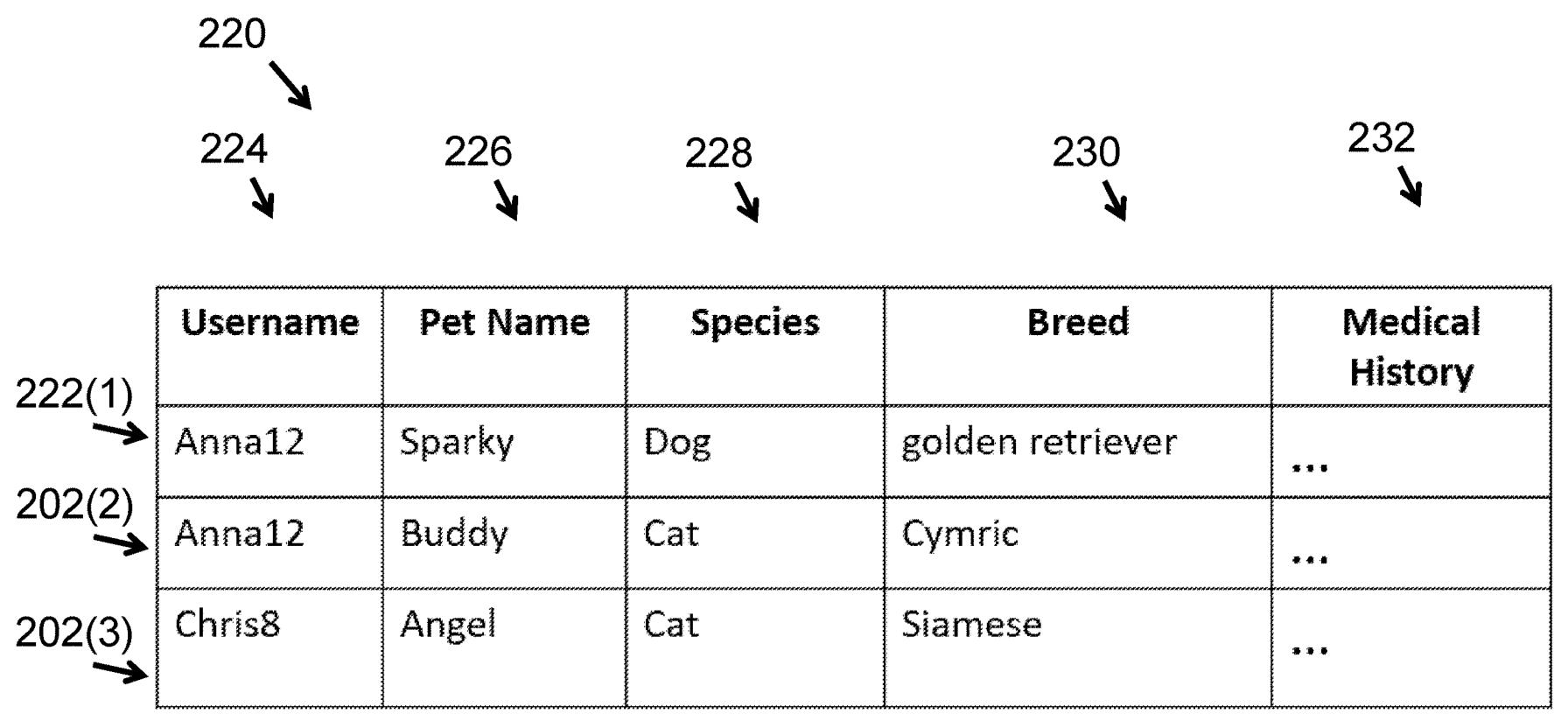

| Username | Pet Name | Species | Breed | Medical History |
|---|---|---|---|---|
| Anna12 | Sparky | Dog | golden retriever | ... |
| Anna12 | Buddy | Cat | Cymric | ... |
| Chris8 | Angel | Cat | Siamese | ... |

FIG. 2B

| 320 | | | |
|---|---|---|---|
| Provider Username (324) | Service (326) | Procedure (328) | Price (330) |
| pet_hospital6 [322(1)] | veterinary | Vaccinations | $80-$100 |
| pet_hospital6 [322(2)] | veterinary | Spay/neuter | $150 |
| pet_hospital6 [322(3)] | veterinary | X-rays | $170-$200 |
| garcia_nina | Veterinary | Vaccinations | $60-$85 |
| petsinc | Grooming | haircut | $30-$35 |

FIG. 3B

COMPUTER PLATFORM AND MOBILE APPLICATION FOR SERVICES PROVIDER SEARCHING OVER A NETWORK

CROSS-REFERENCES TO RELATED APPLICATIONS

This application claims priority to U.S. Provisional Patent Application No. 62/935,148, filed on Nov. 14, 2019, entitled "E-Commerce Website and Mobile Application for Veterinary Services Provider Platform," the entirety of which is incorporate by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

TECHNICAL FIELD

The present disclosure relates generally to a mobile applications and computer platforms. More particularly, the present disclosure relates to a computer platform and mobile application for service provider searching over a network.

BACKGROUND OF THE INVENTION

Parties encounter problems when using the Internet to search for information. Specifically, it can be difficult for an Internet users to find the specific information about a service that the user is searching for and that the user desires to engage in. This may be due, in part, to the over-abundance of information available on the Internet. Even if these users find the information they seek, it can be difficult to compare the information about the different services in order to make a good decision about which service(s) to use.

For example, as more and more people own pets, demand for pet-related services has increased. It can be difficult for pet owners to know what pet-related services are offered in their area and who offers these services. A pet owner could use a generic search engine on the Internet to obtain information about relevant pet-related services, but it takes a large amount of time for the pet owner to obtain a sufficient amount of information. Even if the pet owner still has no way of easily comparing the services described in the obtain information to determine who offers competitive pricing or who has high customer satisfaction. Furthermore, it can difficult for pet owners to find information about pet-related services customized for their type of pet. Veterinary costs can be extremely expensive, which restricts a pet owner's access to pet care. This may deprive some animals of adequate veterinary care and services because of cost. Giving pet owners access to veterinary care with competitive pricing can reduce this problem.

What is needed, then, is computer platform and mobile application for service provider searching over a network so that pet owners can obtain quickly and conveniently find information on the Internet about the services they seek and compare the information in an efficient manner.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The disclosure generally relates to a computer platform and mobile application for service provider searching over a network. The computer platform may include a veterinary service provider platform, which may allow users of mobile devices or other computing devices to search for pet-related services such a veterinary services or grooming services. The veterinary service provider platform may receive search criteria and may return pet-related services provider information that conforms with the search criteria or allow pet-related service providers to submit bids to perform pet-related services. Customer users may be able to make appointments or otherwise obtain pet-related services through the platform. The platform may accept payment from the customer user, provide payment to the provider users, and charge a fee for using the platform.

One aspect of the disclosure is a system. The system may include a first computing device, a second computing device, or a server in data communication with the first computing device and the second computing device over a data network. The server may include a processor. The server may include a non-transitory computer-readable storage medium including computer-readable instructions. The processor, in response to executing the computer-readable instructions, may be configured to perform one or more functions. The processor may receive, over the data network, first user data from the first computing device. The first user data may correspond to a first user of the first computing device. The processor may store the first user data in a first database in data communication with the server. The first database may be configured to store a plurality of user data. The processor may receive, over the data network, first provider data from the second computing device. The first provider data may correspond to a first provider user of the second computing device. The processor may store the first provider data in a second database in data communication with the server. The second database may be configured to store a plurality of provider data. The processor may be configured to receive, over the data network, first provider search data from the first computing device. The processor may select at least a portion of the plurality of provider data from the second database. The selected portion of the plurality of provider data may satisfy, within a predetermined criteria, the first provider search data. The processor may be configured to send search response data based on the selected portion of the plurality of provider data to the first computing device.

Another aspect of the disclosure may include an apparatus. The apparatus may include a processor and a non-transitory computer-readable storage medium including computer-readable instructions. The processor, in response to executing the computer-readable instructions, may be configured to perform one or more functions. The processor may receive, over the data network, first user data from a first computing device. The first user data may correspond to a first user of the first computing device. The processor may store the first user data in a first database in data communication with the processor. The first database may be configured to store a plurality of user data. The processor may receive, over the data network, first provider data from a second computing device. The first provider data may correspond to a first provider user of the second computing device. The processor may store the first provider data in a second database in data communication with the processor. The second database may be configured to store a plurality of provider data. The processor may be configured to receive, over the data network, first provider search data from the first computing device. The processor may select at least a portion of the plurality of provider data from the second database. The selected portion of the plurality of provider data may satisfy, within a predetermined criteria, the first provider search data. The processor may be configured to send search response data based on the selected portion of the plurality of provider data to the first computing device.

Another aspect of the disclosure includes a method. The method may include a computer-implemented method for service provider searching over a network. The method may include receiving, over a data network, first user data from a first computing device. The first user data may correspond to a first user of the first computing device. The method may include storing the first user data in a first database in data communication with the processor. The first database may be configured to store a plurality of user data. The method may include receiving, over the data network, first provider data from a second computing device. The first provider data may correspond to a first provider user of the second computing device. The method may include storing the first provider data in a second database in data communication with the processor. The second database may be configured to store a plurality of provider data. The method may include receiving, over the data network, first provider search data from the first computing device. The method may include selecting at least a portion of the plurality of provider data from the second database. The selected portion of the plurality of provider data may satisfy, within a predetermined criteria, the first provider search data. The method may include sending search response data based on the selected portion of the plurality of provider data to the first computing device.

The various aspects of the disclosure improve the functioning of a computer device. For example, the server is configured to select service provider data based on search data provided by a user from a first user device (such as a mobile computing device) based on provider data matching (or at least satisfying) search criteria provided in the search data. By selecting the satisfactory or matching provider data using pet-related data provided in the search data, user account data stored by the server, and provider account data stored by the server, the server is able to provide more accurate and more relevant search results than a generic search engine. The server is also presents the improved search results to the user on the user's computing device in an manner that is more convenient and easier to read than conventional search engine results, which improves the user's experience with the platform and mobile application.

The various aspects of the disclosure address problems arising in the context of pet-related service Internet searching. Such problems include the searching user being overwhelmed with search results that may be irrelevant or unhelpful and the search results being presented in a manner that is difficult to read and compare. The aspects of the disclosure solve these problems by providing improved search results and providing them to the searching user in an improve ways such that the results are more accurate and relevant and the user's device displays them in a more convenient manner.

Numerous other objects, advantages and features of the present disclosure will be readily apparent to those of skill in the art upon a review of the following drawings and description of a preferred embodiment.

BRIEF DESCRIPTION OF THE DRAWINGS

FIG. 2A is a schematic block diagram illustrating one embodiment of user data for a computer platform and mobile application for service provider searching over a network.

FIG. 2B is a schematic block diagram illustrating another embodiment of user data for a computer platform and mobile application for service provider searching over a network.

FIG. 3B is a schematic block diagram illustrating another embodiment of provider data for a computer platform and mobile application for service provider searching over a network.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

Figure 1:
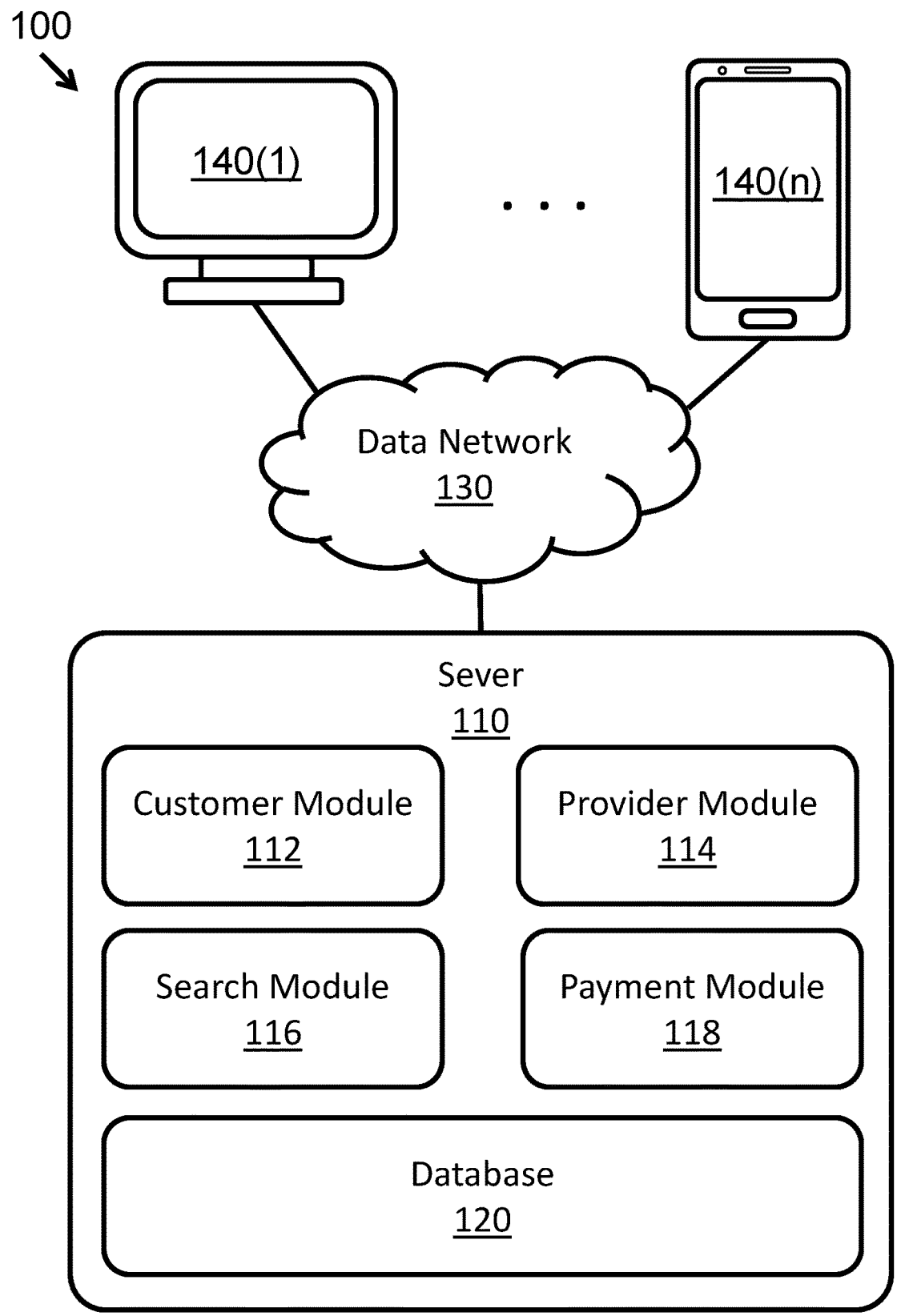
FIG. 1 is a schematic block diagram illustrating one embodiment of a system for a computer platform and mobile application for service provider searching over a network.

FIG. 1 depicts one embodiment of a system 100. The system 100 may include a system for a computer platform and mobile application for veterinary services providers. The system 100 may include a server 110. The server 110 may include a veterinary services provider platform (hereinafter, "the platform"). The server 110 may include one or more modules such as a customer module 112, a provider module 114, a search module 116, and a payment module 118. The server 110 may include one or more databases 120. In some embodiments, the system 100 may include a data network 130. The system 100 may include one or more computing devices such as computing devices 140(1)-(n).

The one or more computing devices 140(1)-(n) may include a first computing device 140(1) and a second computing device 140(2). The first computing device 140(1) may correspond to a first user. The first user may include a customer user. A customer user may include a user who owns a pet. The customer user may be interested in searching for pet-related services. The second computing device 140(2) may correspond to a first provider user. A provider user may include a person who provides pet-related services or may include a business that provides pet-related services.

The server 110 may be in data communication with the first computing device 140(1) and the second computing device 140(2). The server 110 may be in data communication with the first computing device 140(1) and the second computing device 140(2) via the data network 130. The server 110 may include a processor. The server 110 may include a non-transitory computer-readable storage medium including computer-readable instructions. The computer-readable instructions may include the customer module 112, the provider module 114, the search module 116, or the payment module 118. The processor, in response to executing the computer-readable instructions, may be configured to receive and store first user data from the first computing device, receive and store first provider data from the second computing device, receive first provider search data from the first computing device, select at least a portion of the plurality of provider data from the second database that may satisfy, within a predetermined criteria, the first provider search data, and send search response data based on the selected portion of the plurality of provider data to the first computing device.

In one embodiment, the first user may use the first computing device 140(1) to enter first user data, which may include pet information, into the first computing device 140(1). The first computing device 140(1) may send the first user data (including the pet information) to the server 110. The customer module 112 of the server 110 may store the first user data in the database 120. The first provider user may use the second computing device 140(2) to enter provider data into the second computing device 140(2). The provider data may include information about pet-related services that the first provider user offers. The second computing device 140(2) may send the provider data to the server 110. The provider module 114 may store the provider data in the database 120.

The first user may use the first computing device 140(1) to enter first provider search data into the computing device 140(1). The first computing device 140(1) may send the first provider search data to the server 110. The search module 116 may process the first provider search data and select one or more provider users whose provider data satisfy search criteria in the provider search data. The search module 116 may generate search response data based on the one or more selected provider users. The server 110 may send the first computing device 140(1) the search response data.

The first user may select, via the first computing device 140(1), a provider user whose provider data is included in the search response data. The first computing device 140(1) may send data to the server indicating that the first user desires to use the selected provider user to provide pet-related to the first user's pet. The payment module 118 may use the first user's payment information to charge the first user for the pet-related services. The payment module 118 may send a portion of the charged amount to the selected provider user. The payment module 118 may send a portion of the charged amount to the veterinary services provider platform.

The following description providers further information about one or more embodiments of the disclosure. In one embodiment, the first user may include a customer user. The first user may include a person seeking pet-related services. The first user may own, take care of, or otherwise be in charge of one or more pets. In some embodiments, the first user may include a person or may include a business entity. The first computing device 140(1) may correspond to the first user. In some embodiments, the first provider user may include a person or a business entity that provides pet-related services. The second computing device 140(2) may correspond to the first provider user. In some embodiments, a third computing device 140(3), a fourth computing device 140(4), a fifth computing device 140(5), etc. may correspond to a second, third, fourth, etc. user or provider user. It should be noted that although some functionality described herein is described as being performed by the first user of the first computing device 140(1), the functionality could be performed by any user of any corresponding computing device 140. Similarly, functionality performed by the first provider user of the second computing device 140(2) could also be performed by any provider user of any corresponding computing device 140.

In one embodiment, the server 110 may include a computer server. The server 110 may include an application server, a database server, a desktop computer, a laptop computer, a tablet computer, a mobile smartphone device, or some other type of computing device. The server 110 may include multiple computing devices networked together and in data communication with each other. The server 110 may include one or more computer processors that process computer code or other data. The server 110 may include computer storage devices that may store executable computer code, computer files, or other data. The computer storage devices may include the modules 112-118 or the database 120.

The server 110 may include a veterinary services provider platform. The veterinary services provider platform may include the module 112-118 and the database 120. The veterinary services provider platform may include functionality that connects users with provider users that comply with a user's search criteria. The provider users may include providers of pet-related services. The veterinary services provider platform may include functionality for collecting or processing payments from users and providing payments to provider users.

In some embodiments, the customer module 112 may include a software application executable on the server 110. The customer module 112 may receive user data from a computing device 140 (e.g., the customer module 112 may receive first user data from the first computing device 140(1)). The user data may include personal information about a user. The personal information may include the user's name, age, contact information (e.g., mailing address, email address, phone number, etc.), username and password on the veterinary services provider platform, or other personal information. The user data may include pet information. Pet information may include information about one or more pets of the user. The pet information may include the pet's name, species (e.g., dog, cat, fish, horse, etc.), breed (e.g., golden retriever, German shepherd, beagle, etc. for dogs; Siamese, ragdoll, Cymric, etc. for cats), or age. The pet information may include medical information such as medical conditions, allergies, or medical history (e.g., vaccinations received, medical procedures performed, etc.).

The customer module 112 may store the user data in the database 120. In some embodiments, the user data may be stored in a user account stored by the database 120. The customer module 112 may create a user account for a user. The user account for the user may be associated with his or her user data stored in the database 120. The customer module 112 may include functionality to allow a user to log into his or her user account using a username and password stored in the database 120. In some embodiments, the user account may be associated with a third-party service (such as Google or Facebook) and the user may use an account of the third-party service to log into the user account on the veterinary services provider platform. The customer module 112 may update or modify user data in the database 120 in response to commands from the corresponding user.

FIG. 2A depicts one example of user data stored in the database 120. The database 120 may include a table 200. The table 200 may include one or more data records 202. Although table 200 depicts data records 202(1)-(3), the table 200 may include data records 202(1)-(n), where n is the number of data records in the table 200. The table 200 may include one or more attributes 204-212. An attribute of the one or more attributes 204-212 may include a category of data stored in the table 200. As depicted in FIG. 2A, the table 200 may include attributes such as username 204, password hash 206, name 208, email 210, or address 212. Username 204 may include the username of the user of the veterinary services provider platform indicated by the data record 202. Password hash 206 may include the hash of a user's password such that a user can log into the platform. Name 208 may include the name of the user indicated by the data record 202. Email 210 may include the email address of the user indicated by the data record 202. Address 212 may include the physical address of the user indicated by the data record 202. The table 200 may include other attributes that may store other user information.

FIG. 2B depicts another example of user data stored in the database 120. The database 120 may include a table 220. The table 220 may store user data related to one or more pets of the users of the platform. The table 220 may include one or more data records 222. The data records 222(1)-(n) may be similar to the data records 202(1)-(n) of the table 200 of FIG. 2A, except that the data records 222(1)-(n) may store pet information. The table 220 may one or more attributes 224-232. The one or more attributes may include a username 224, a pet name 226, a species 228, a breed 230, or a medical history 232. The username 224 may include the username of the owner of the pet indicated by the data record 222, and may match a username 204 from the table 200 of the FIG. 2A. The pet name 226 may include the name of the pet indicated by the data record 222. The species 228 may include the name of the species of the pet indicated by the data record 222. The breed 230 may include the name of the breed of the pet indicated by the data record 222. The medical history 232 may include information about the medical history of the pet indicated by the data record 222. In some embodiments, the medical history information may be stored in a separate table in the database 120 such that each event in the pet's medical history is contained within its own data record in that table. The table 220 may include other pet information.

In one or more embodiments, the provider module 114 may include a software application executable on the server 110. The provider module 112 may receive provider data from a computing device 140 (e.g., the provider module 112 may receive the first provider data from the second computing device 140(2)). The provider data may include a name (e.g., name of the person providing pet-related services, business name, etc.), contact information, or a username and password for the veterinary service provider platform. The provider data may include service information. The service information may include the type of services offered by the provider user (e.g., veterinary, grooming, pet sitting, etc.). The service information may include medical procedures the provider user offers. The service information may include pricing information associated with a medical procedure. The pricing information may include a single price, a price range, a maximum or minimum price, or other pricing information.

The provider module 114 may store the provider data in the database 120. In some embodiments, the provider data may be stored in a user account stored by the database 120. The provider module 114 may create a user account for a provider user. The user account for the provider user may be associated with the provider user's provider information stored in the database 120. The provider module 114 may include functionality to allow a provider user to log into its user account using a username and password stored in the database 120. In some embodiments, the user account may be associated with a third-party service (such as Google or Facebook) and the provider user may use an account of the third-party service to log into the user account on the veterinary services provider platform. The provider module 114 may update or modify provider information in the database 120 in response to commands from the provider user.

Figure 3A:
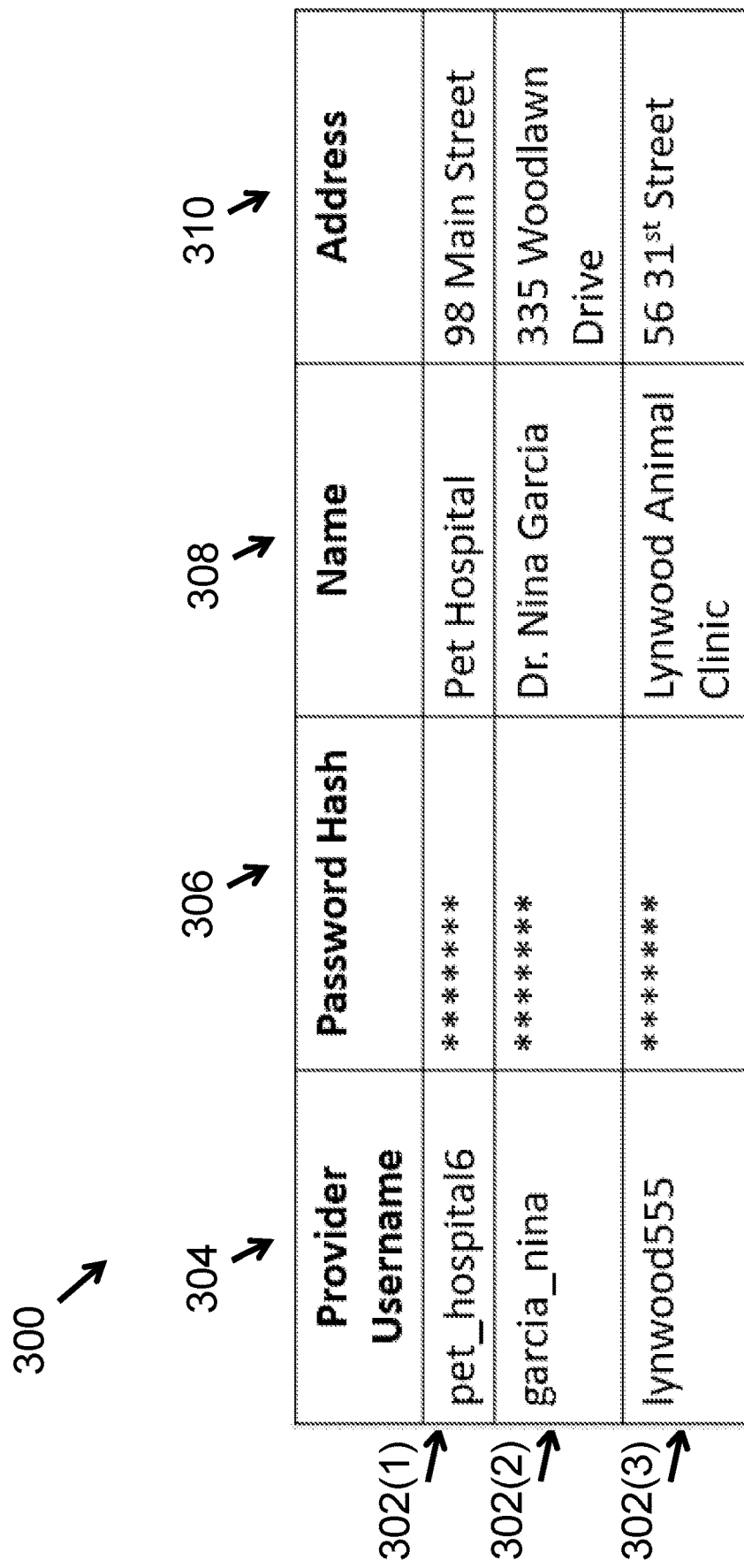
FIG. 3A is a schematic block diagram illustrating one embodiment of provider data for a computer platform and mobile application for service provider searching over a network.

FIG. 3A depicts one example of provider data stored in the database 120. The database 120 may include a table 300. The table 300 may include one or more data records 302, which may be similar to the data record 202 or 222 of FIG. 2A or FIG. 2B. The table 300 may include one or more attributes 304-310, which may contain categories of information, similar to the attributes 204-212 or 224-232 of FIG. 2A or FIG. 2B. For example, as depicted in FIG. 3A, the attributes may include provider username 304, password hash 306, name 308, or address 310. The provider username 304 may include the username of the provider user indicated by the data record 302. The password hash 306 may include the hash of the provider user's password such that the provider user can log into the platform. The name 308 may include the name of the provider user indicated by the data record 302. For example, the name 308 may include a business entity name (e.g., "Lynwood Animal Clinic") or a person's name (e.g., Dr. Nina Garcia). The address 310 may include the physical address of the provider user. The table 300 may include other provider data, such as rating data for the provider user.

FIG. 3B depicts another embodiment of provider data. FIG. 3B includes a table 320. The table 320 may include provider data related to services provided by a provider user. For example, the table 320 of FIG. 3B may include provider data related to medical procedures offered by one or more provider users of the platform. The table 320 may include one or more data records 322 and one or more attributes 324-330. The one or more attributes may include a provider username 324, a service 326, a procedure 328, and a price 330. The provider user name 324 may include the username of a provider user that provides the service indicated by the data record 322. The provider user name 324 may include a username in the table 300 of the FIG. 3A. The service 326 may include a type of service offered by the corresponding provider user. For example, a service may include veterinary services, grooming services, or other types of services. A procedure 328 may include a medical procedure, a grooming procedure, or some other type of procedure the corresponding provider user may offer. The price may include a price at which the provider user offers the corresponding procedure, a price range, a maximum price, or a minimum price. The table 320 may include other pet service-related data, such as a rating for the procedure.

In one embodiment, the search module 116 may include a software application executable on the server 110. The search module 116 may receive provider search data (e.g., the first provider search data from the first computing device 140(1)) from a computing device. The provider search data may include search criteria. The search criteria may include the types of pets a desired provider provides services to, a medical procedure the first user desires to be performed on a pet, a service (e.g., grooming, pet-sitting) the user desires to be performed with the pet, a price the user is willing to pay for the medical procedure/service, a price range in which the user is willing to pay for the medical procedure/service, a geographic area, or a rating or a range of ratings associated with a desired provider. In some embodiments, the search module 116 may combine data from the provider search data with a portion of the user data stored in the database 120. This combined provider search information-user data may be referred to as "provider search information."

The search module 116 may process the provider search information and determine one or more provider users whose provider data satisfy search criteria in the provider search information. In one embodiment, provider data satisfying the search criteria may include a medical procedure of the provider data of a provider user (e.g., as stored in the database 120) matching a medical procedure of the first provider search data. Provider data satisfying the search criteria may include a geographic location of the first provider search data being within a distance threshold of a geographic location of provider data of a provider user. Provider data satisfying the search criteria may include price data of provider data of a provider user falling within price range data of the first provider search data.

As an example, the provider search data may include the search criteria of: (1) a veterinarian that accepts dogs as patients, (2) the veterinarian performs annual exams on dogs, (2) the veterinarian charges a maximum of $60 for the annual exam, (3) the veterinarian is within 5 miles of the user's address (which the search module 116 may retrieve from the user data stored in the database 120), and (4) the veterinarian has a rating of at least 4 out of a maximum of 5 on the internal rating system of the veterinary services provider platform.

The search module 116 may examine the provider data stored in the database 120 to determine which provider users' data include at least a portion of provider data that satisfies the search criteria. In response to determining that the provider data stored in the database 120 of one or more provider users satisfies the search criteria, the search module 116 may select at least a portion of the provider data of those provider users.

In some embodiments, the search module 116 may not be able to determine at least one provider user that satisfies all of the search criteria of the provider search data. In response, the search module 116 may determine which provider's or providers' user data partially satisfies the search criteria. The search module 116 may rank the partially satisfying provider users based on an order of importance of the search criteria. For example, the customer user may indicate that the price criteria is more important than a distance criteria. In response, provider users with similar provider data but differing prices on the same procedure/service may have different rankings. The search module 116 may select a portion of the partially satisfying provider users based on their ranking.

In one embodiment, the search module 116 may provide a bidding functionality. The bidding functionality may include the first user submitting the first provider search data with the search criteria. The search module 116 may send the search criteria to at least a portion of the computing devices 140(2)-(n) of the provider users. The search module 116 may send the search criteria to at least a portion of the computing devices 140(2)-(n) of the provider users based on the provider data stored in the database 120 of the provider users satisfying at least a portion of the search criteria. The provider users that receive the search criteria via their respective computing devices 140(2)-(n) may each submit a bid indicating how much the provider user will charge for the service(s)/procedure(s) included in the search criteria. The search module 116 may collect the one or more bids and may include, in search response data, at least a portion of the provider data of the provider user who won the bidding (e.g., contact information for winning provider user). A provider user may win the bidding based on having the lowest price bid or based on some other bidding criteria.

In one embodiment, the search module 116 may generate the search response data based on the one or more selected provider users. The search response data may include a portion of the provider data of the one or more selected provider users. The search response data may include a provider's name, address, hours of operation, pricing, rating, or other provider user information. The server 110 may send the first computing device 140(1) the search response.

In some embodiments, the first user may use the first computing device 140(1) to select a provider user included in the search response data. The first computing device 140(1) may send data to the server indicating that the first user desires to use the selected provider user to provide pet-related services to the first user's pet. The payment module 118 of the server 110 may use the first user's payment information to charge the user for the pet-related services. The user's payment information may be stored in the database 120 or may be included in the data sent from the first computing device 140(1).

In some embodiments, the payment module 118 may collect a portion of the charged amount as a fee. The fee portion may include a percentage of the amount charged by the provider for the pet-related services. For example, a veterinarian provider user may charge $60 for an annual dog exam. The fee portion may include 5% of the $60 charged (i.e., $3). Thus, the payment module 118 may charge the first user $63. Other portions or percentages may also be used.

In one embodiment, the database 120 may include a database, file system, or some other computer data storage or computer data repository implementation. The database 120 may be located on the server 110 or may be located on another device in data communication with the server 110. The data network 130 may include routers, switches, wired networks, wireless networks, local area networks (LANs), wide area networks (WANs), internet services providers (ISPs), the Internet, or other networking devices and functionality.

In one embodiment, the server 110 may provide a rating functionality. The provider module 114 may include, in each provider user account, a rating. The rating may indicate customer satisfaction with the provider user. After a user uses a provider user's services, the user may submit rating data to the server 110 via the first computing device 140(1). The provider module 114 may aggregate the plurality of customer reviews corresponding to a provider user to calculate an overall rating for the provider user. The provider user's rating may be displayed on the first computing device 140(1) when a user searches for a provider user, when a user receives the search response, or at some other point in time. The provider rating may include a rating from 1 to 5, 1 to 10, or a number of stars and half stars (wherein the higher the number, the better the rating).

In one or more embodiments, the server 110 may send reminder data to the first computing device 140(1). The reminder data may include a reminder to the first user of an upcoming appointment with a provider user. The server 110 may send the reminder data automatically in response to a predetermined time occurring or a predetermined time period expiring. For example, the server 110 may send the reminder data one day before the appointment, one hour before the appointment, one week before the appointment, or at another time interval. The reminder data may include data reminding the customer user to book an appoint about a recommended scheduled event such as vaccinations, parasite control, or other reoccurring procedures.

In some embodiments, the pet-related services offered by provider users and searchable by customer users may include veterinary services, grooming services, walking services, pet sitting services, pet boarding or kenneling services, pet training services, at-home visits, teleconferencing services with a provider user, after-hours emergency services, prescription services, or other services.

In one embodiment, veterinary services for dogs may include annual exams, vaccinations (e.g., Distemper/Measles/Parainfluenza; Distemper, Adenovirus, Parainfluenza, and Parvovirus (DHPP); rabies; kennel cough; Distemper, Adenovirus type 2, Parainfluenza, and Canine Parvovirus (DA2P-CPV); Lyme disease, leptospirosis, canine influenza), parasite control (e.g., heart worm prevention, flea/tick prevention, deworming, heart worm testing, fecal examination), microchipping, dental care (e.g., tooth cleaning/extraction), general veterinary visits, skin issues, ear infections, urinary tract infections (UTIs), vomiting/diarrhea, poisoning, allergies, surgery, diagnostics (e.g., x-rays, samples), emergency care, or other veterinary services.

In some embodiments, veterinary services for cats may include vaccinations (e.g., feline distemper, feline leukemia, rabies, feline viral rhinotracheitis, calicivirus, panleukopenia, or feline infectious peritonitis), parasite control, microchipping, dental care, general veterinary care, surgery, diagnostics, emergency services, or other services. Some cat-related veterinary services may be similar to the dog-related veterinary services.

Other animals that provider users may care for include hamsters, guinea pigs, rabbits, chinchillas, mice, rats, ferrets, gerbils, birds, reptiles, horses, livestock (e.g., cattle, pigs, goats, or sheep). Some of the services may be similar to the cat services or dog services.

In one or more embodiments, the one or more computing devices 140(1)-(n) may interact with the server via a browser interface, a mobile application, or a software application installed on the computing devices 140(1)-(n). In some embodiments, the server 110, one or more of the computing devices 140(1)-(n), or components of these devices may be implemented using virtualization.

Figure 4:
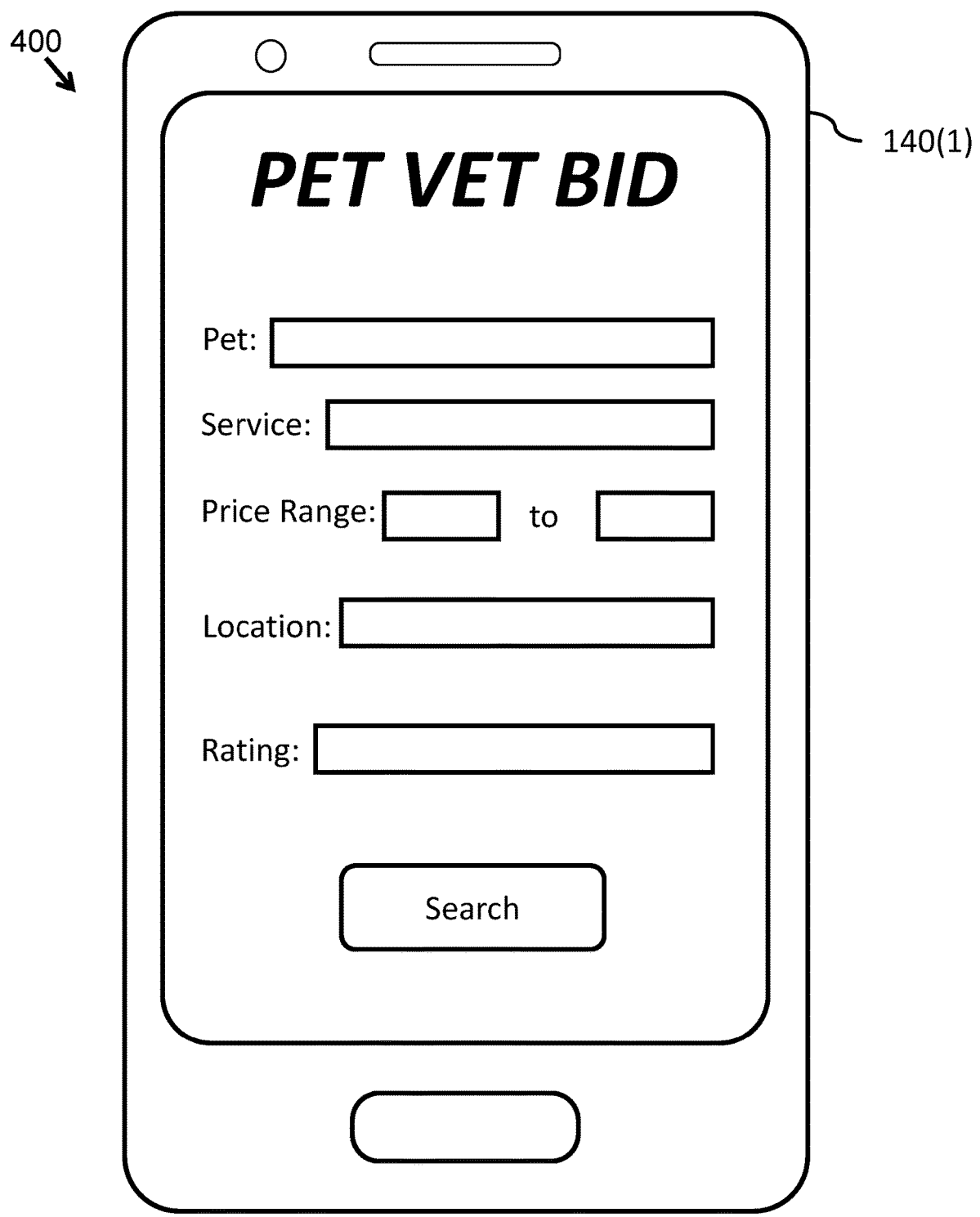
FIG. 4 is a front view illustrating one embodiment of a graphical user interface on a computing device for a computer platform and mobile application for service provider searching over a network.

FIG. 4 depicts one embodiment of a user interface 400. The user interface 400 may include a user interface for a computer platform and mobile application for service provider searching over a network. The user interface 400 may be a search user interface. The user interface 400 may be displayed on the first computing device 140(1). The user interface 400 may include text boxes, drop down boxes, or other user interface components that may allow a user to submit provider search data to the server 110. The user interface 400 may include a component to receive pet information. The pet information may include a pet profile or a species of a pet. The user interface 400 may include a component to receive information about the desired pet-related service. The user interface 400 may include a component that receives pricing information. For example, as depicted in FIG. 4, the user can enter a minimum price and maximum price. The user interface 400 may include a component that receives location information. The user interface 400 may include a component that may receive rating information, such as a minimum acceptable rating of a provider.

Figure 5:
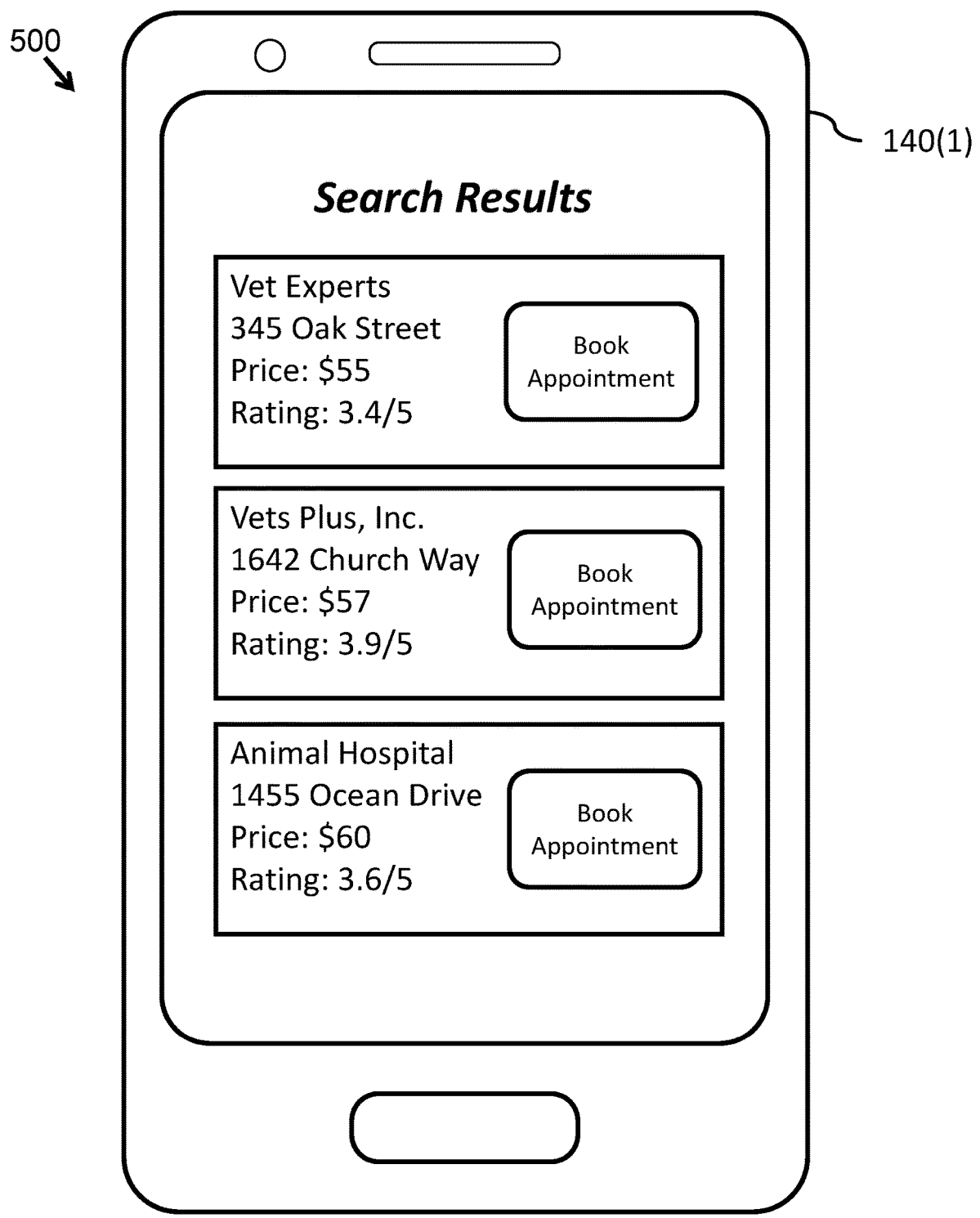
FIG. 5 is a front view illustrating another embodiment of a graphical user interface on a computing device for a computer platform and mobile application for service provider searching over a network.

FIG. 5 depicts one embodiment of a user interface 500. The user interface 500 may include a user interface for a computer platform and mobile application for service provider searching over a network. The user interface 500 may include a search results user interface. The user interface 500 may include one or more portions of provider data. The provider data displayed on the user interface 500 may include provider data corresponding to provider users that conform to the user's provider search data. For example, the user interface 500 may include the business names, locations, pricing, and rating information of various provider users. The user interface 500 may include a button or other component that may allow a user to book an appointment or otherwise obtain the services of the corresponding provider user.

Figure 6A:
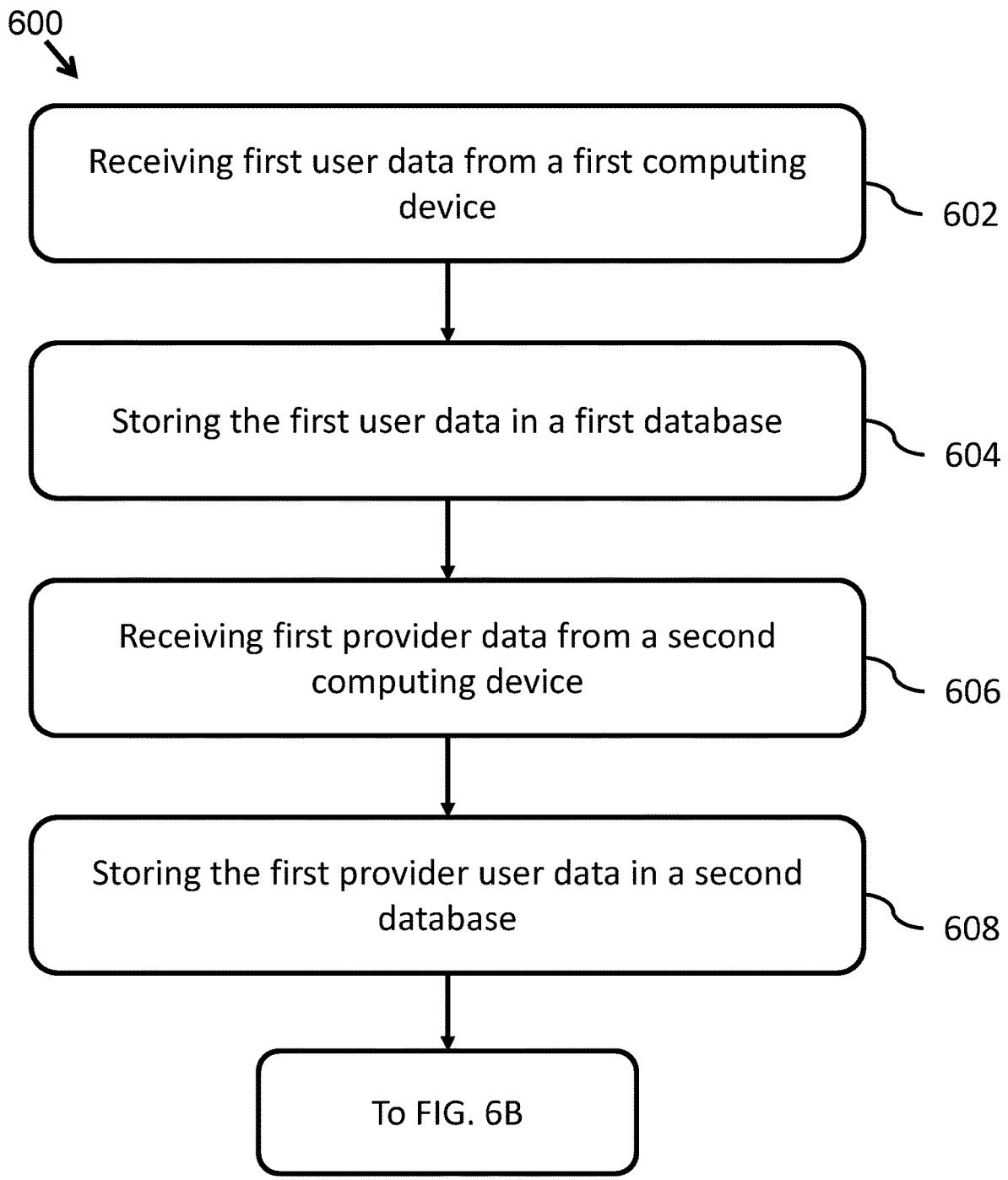
FIGS. 6A-B is a flowchart diagram illustrating one embodiment of a method for a computer platform and mobile application for service provider searching over a network.
Figure 6B:
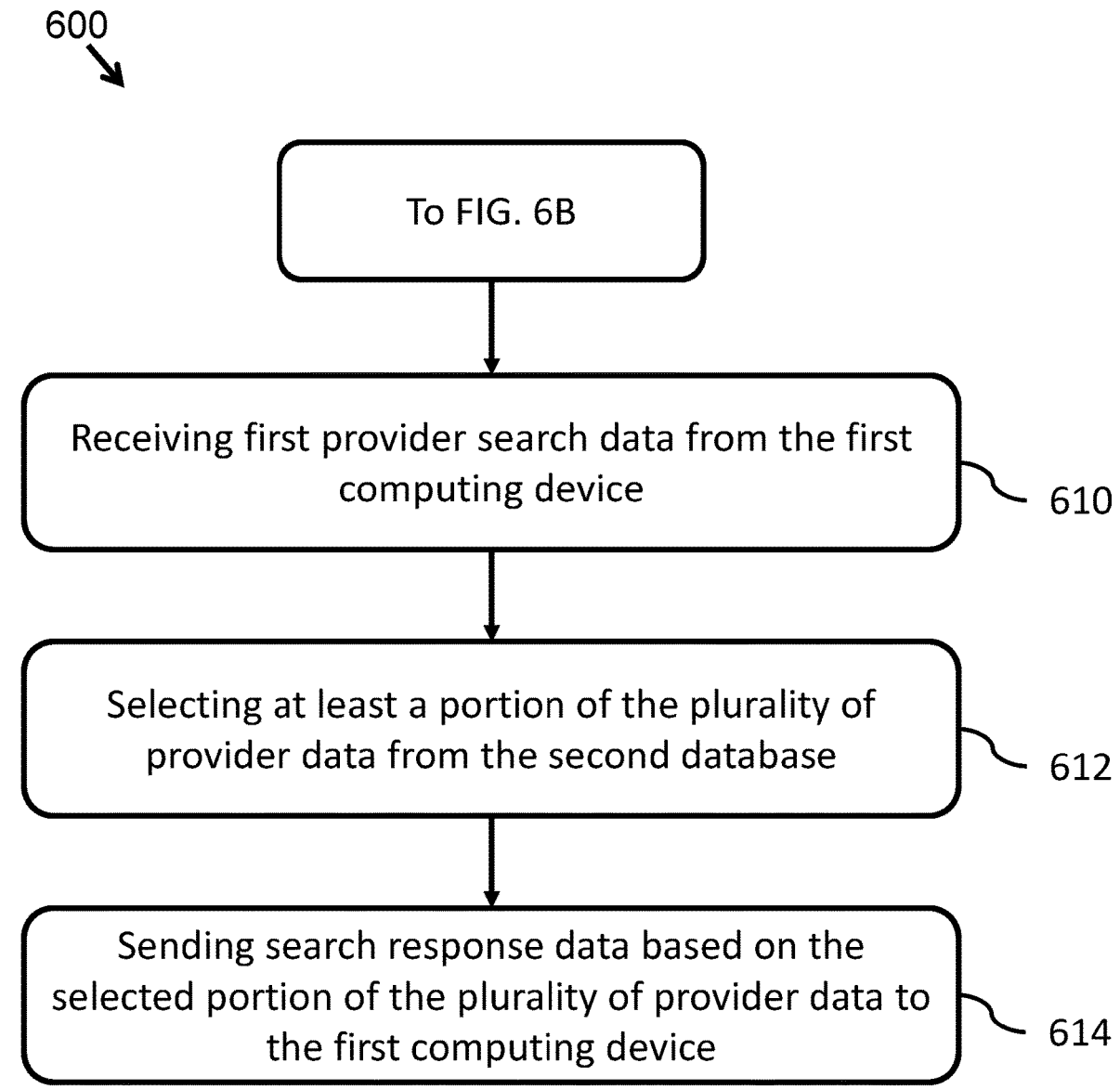

FIGS. 6A-B depict one embodiment of a method 600. The method may include a method for a computer platform and mobile application for service provider searching over a network. The method 600 may include receiving 602, over a data network, first user data from a first computing device. The first user data may correspond to a first user of the first computing device. The method 600 may include storing 604 the first user data in a first database in data communication with the processor. The first database may be configured to store a plurality of user data. The method 600 may include receiving 606, over the data network, first provider data from a second computing device.

The first provider data may correspond to a first provider user of the second computing device. The method 600 may include storing 608 the first provider data in a second database in data communication with the processor. The second database may be configured to store a plurality of provider data. The method 600 may include receiving 610, over the data network, first provider search data from the first computing device. The method 600 may include selecting 612 at least a portion of the plurality of provider data from the second database. The selected portion of the plurality of provider data may satisfy, within a predetermined criteria, the first provider search data. The method 600 may include sending 614 search response data based on the selected portion of the plurality of provider data to the first computing device. In some embodiments, one or more steps of the method 600 may be performed by the one or more modules 112-118 of the server 110, as described above.

The systems, apparatuses, and methods described herein improve the functioning of computing technology. The server 110 is configured to select provider data based on provider search data provided by a user from the first user device 140(1) based on provider data, stored in the database 120, matching (or at least satisfying) search criteria provided in the provider search data. By selecting the satisfactory or matching provider data using pet-related data provided in the provider search data, user account data stored by the server 110, and provider data stored by the server 110, the server is able to provide more accurate and more relevant search results than a generic search engine. For example, the first user is able to search by service type (e.g., grooming, medical procedures, pet-sitting, etc.), procedure type (e.g., vaccinations, haircutting, etc.), prices, ratings, and other data. In conventional search engine searching, the first user is able to only search by text string and other limited functionality. By being able to create very specific search criteria, the aspects of the disclosure improve over conventional searching.

The server is also presents the improved search results to the user on the user's computing device in an manner that is more convenient and easier to read than conventional search engine results, which improves the user's experience with the platform and mobile application. For example, FIG. 5 displays search results and allows a user to book or reserve a provider's services, providing convenience and readability to the user, which improves over conventional searching where results are simply listed in some arbitrary order.

The various aspects of the disclosure address problems arising in the context of pet-related service Internet searching. Such problems include the searching user being overwhelmed with search results that may be irrelevant or unhelpful and the search results being presented in a manner that is difficult to read and compare. The aspects of the disclosure solve these problems by providing improved search results and providing them to the searching user in an improve ways such that the results are more accurate and relevant and the user's device displays them in a more convenient manner.

The various aspects of the disclosure address problems arising in the context of pet-related service Internet searching. Such problems include the searching user being overwhelmed with search results that may be irrelevant or unhelpful and the search results being presented in a manner that is difficult to read and compare. The aspects of the disclosure solve these problems by providing improved search results and providing them to the searching user in an improve ways such that the results are more accurate and relevant and the user's device displays them in a more convenient manner.

As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having program code embodied thereon.

In some embodiments, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s). Furthermore, although some module functionality is disclosed herein, some functionality associated with one module may be performed by a different module in some embodiments.

The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processor devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processor device receives computer readable program instructions from the network and forwards the computer readable program instructions for storage in a computer readable storage medium within the respective computing/processor device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute on a supercomputer, a compute cluster, or the like. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations or block diagrams of methods, apparatuses, systems, or computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Thus, although there have been described particular embodiments of the present invention of a new and useful COMPUTER PLATFORM AND MOBILE APPLICATION FOR SERVICE PROVIDER SEARCHING OVER A NETWORK, it is not intended that such references be construed as limitations upon the scope of this invention.

What is claimed is:

1. An apparatus, comprising:
 a processor; and
 a non-transitory computer-readable storage medium including computer-readable instructions, wherein the processor, in response to executing the computer-readable instructions, is configured to:
 receive, over a data network, user data from a first computing device, wherein the first user data corresponds to a user of the first computing device and includes first user pet data defining one or more attributes relating to a pet of the first user, the one or more attributes including a species of pet;

store the user data in a first database in data communication with the processor, wherein the first database is configured to store a plurality of user data;

receive, over the data network, first provider data from a second computing device, wherein the first provider data corresponds to a first provider user of the second computing device;

receive, over the data network, second provider data from the third computing device, wherein the second provider data corresponds to a second provider user of the third computing device;

receive, over the data network, third provider data from the fourth computing device, wherein the third provider data corresponds to a third provider user of the fourth computing device;

store the first provider data, the second provider data, and the third provider data in a second database in data communication with the processor, wherein the second database is configured to store a plurality of provider data;

receive, over the data network, provider search data from the first computing device, the provider search data including data indicating a plurality of search criteria and a ranking of the plurality of search criteria in order of importance, the plurality of search criteria including a type of a pet-related service; a future date of the pet-related service; a first price value; and a geographic area;

generate provider search information, wherein the provider search information is based on a combination of a portion of the user data from the first database with the first provider search data, wherein the portion of the user data includes the one or more attributes relating to the pet of the first user;

identify a first determination that a first portion of the plurality of provider data partially satisfies the provider search information, the first portion including provider data corresponding to the first provider data, the second provider data, and the third provider data;

in response to the first determination, identify a ranking of the first portion of the plurality of provider data, wherein ranking the first portion is based on one or more of the plurality of search criteria being satisfied by each of the first portion and the ranking of the plurality of search criteria in order of importance;

in response to the identified ranking, select, from the first portion, a second portion of the plurality of provider data from the second database based on a second determination that the second portion has a top rank among the first portion, the second portion including provider data corresponding to the first provider data and the second provider data;

in response to the selection of the second portion, send a first prompt to the second computing device indicating a request for a second price value, and a second prompt the third computing device indicating a request for a third price value;

receive, over the data network, the second price value from the second computing device and the third price value from the third computing device;

based on a third determination that the second price value is within a predetermined range of the first price value and the third price value is outside the predetermined range of the first price value, select a third portion of the plurality of provider data from the second database, the third portion including provider data corresponding to the first provider data, and send search response data based on the third portion of the plurality of provider data to the first computing device; and in response to a fifth determination that a present date is within a predetermined time period of the future date of the pet-related service, send reminder data to the first computing device wherein the first computing device:
 receives a user input indicating that the first provider performed the pet-related service for the first user,
 in response to receiving the user input, detects location data, and transmits a confirmation that the first user went to the geographic area and the first provider performed the pet-related service for the first user, the confirmation including location data identifying the geographic area;

receive the confirmation from the first computing device; and in response to receiving the confirmation, update the second database by storing the location data in the second database as being associated with the first provider, wherein, prior to the first computing device receiving the user input and the processor receiving the confirmation, the first user went to the geographic area and the first provider performed the pet-related service for the first user.

2. The system of claim 1, wherein the one or more attributes relating to a pet of the first user further includes:
 an age of the pet of the first user; and
 medical information of the pet of the first user, wherein the medical information includes a medical condition of the pet of the first user and a medical history of the pet of the first user.

3. The system of claim 2, wherein the first provider data includes a name of the first provider user and contact information of the first provider user, the second provider data includes a name of the second provider user and contact information of the second provider user, and the third provider data includes a name of the third provider user and contact information of the third provider user.

4. The system of claim 3, wherein the first provider data further includes a type of services offered by the first provider user, the second provider data further includes a type of services offered by the second provider user, and the third provider data further includes a type of services offered by the third provider user.

5. The system of claim 4, wherein the type of services offered by each of the first provider user, second provider user, and third provider user each include data indicating at least one of veterinary, grooming, or pet sitting.

6. The system of claim 4, wherein the provider search data further includes data indicating a range of service ratings.

7. The system of claim 6,
 wherein the type of the pet-related service is one of a medical procedure, pet grooming or pet sitting.

8. The system of claim 6, wherein the first determination includes:
 an identification that an offering of services of the first portion of the plurality of provider data matches the type of the pet-related service of the plurality of search criteria; and
 an identification that a geographic location of the first provider search data is within a distance threshold of the geographic area of the plurality of search criteria.

9. The system of claim 8, wherein the search response data includes data indicating the contact information of the first provider user.

10. An apparatus, comprising:
a processor; and
a non-transitory computer-readable storage medium including computer-readable instructions, wherein the processor, in response to executing the computer-readable instructions, is configured to:
receive, over a data network, user data from a first computing device, wherein the first user data corresponds to a user of the first computing device and includes first user pet data defining one or more attributes relating to a pet of the first user, the one or more attributes including a species of pet;
store the user data in a first database in data communication with the processor, wherein the first database is configured to store a plurality of user data;
receive, over the data network, first provider data from a second computing device, wherein the first provider data corresponds to a first provider user of the second computing device;
receive, over the data network, second provider data from the third computing device, wherein the second provider data corresponds to a second provider user of the third computing device;
receive, over the data network, third provider data from the fourth computing device, wherein the third provider data corresponds to a third provider user of the fourth computing device;
store the first provider data, the second provider data, and the third provider data in a second database in data communication with the processor, wherein the second database is configured to store a plurality of provider data;
receive, over the data network, provider search data from the first computing device, the provider search data including data indicating a plurality of search criteria and a ranking of the plurality of search criteria in order of importance, the plurality of search criteria including a type of a pet-related service; a future date of the pet-related service; a first price value; and a geographic area;
generate provider search information, wherein the provider search information is based on a combination of a portion of the user data from the first database with the first provider search data, wherein the portion of the user data includes the one or more attributes relating to the pet of the first user;
identify a first determination that a first portion of the plurality of provider data partially satisfies the provider search information, the first portion including provider data corresponding to the first provider data, the second provider data, and the third provider data;
in response to the first determination, identify a ranking of the first portion of the plurality of provider data, wherein ranking the first portion is based on one or more of the plurality of search criteria being satisfied by each of the first portion and the ranking of the plurality of search criteria in order of importance;
in response to the identified ranking, select, from the first portion, a second portion of the plurality of provider data from the second database based on a second determination that the second portion has a top rank among the first portion, the second portion including provider data corresponding to the first provider data and the second provider data;
in response to the selection of the second portion, send a first prompt to the second computing device indicating a request fora second price value, and a second prompt the third computing device indicating a request for a third price value;
receive, over the data network, the second price value from the second computing device and the third price value from the third computing device;
based on a third determination that the second price value is within a predetermined range of the first price value and the third price value is outside the predetermined range of the first price value, select a third portion of the plurality of provider data from the second database, the third portion including provider data corresponding to the first provider data, and send search response data based on the third portion of the plurality of provider data to the first computing device; and in response to a fifth determination that a present date is within a predetermined time period of the future date of the pet-related service, send reminder data to the first computing device wherein the first computing device:
receives a user input indicating that the first provider performed the pet-related service for the first user,
in response to receiving the user input, detects location data, and transmits a confirmation that the first user went to the geographic area and the first provider performed the pet-related service for the first user, the confirmation including location data identifying the geographic area;
receive the confirmation from the first computing device; and
in response to receiving the confirmation, update the second database by storing the location data in the second database as being associated with the first provider,
wherein, prior to the first computing device receiving the user input and the processor receiving the confirmation, the first user went to the geographic area and the first provider performed the pet-related service for the first user.

11. The apparatus of claim 10, wherein the first determination includes:
an identification that an offering of services of the first portion of the plurality of provider data matches the type of the pet-related service of the plurality of search criteria; and
an identification that a geographic location of the first provider search data is within a distance threshold of the geographic area of the plurality of search criteria.

12. A method, comprising:
receiving, by a server over a data network, user data from a first computing device, wherein the user data corresponds to a user of the first computing device and includes user pet data defining one or more attributes relating to a pet of the user, the one or more attributes including a species of pet;
storing, by the server the user data in a first database in data communication with the processor, wherein the first database is configured to store a plurality of user data;
receiving, by the server over the data network, first provider data from a second computing device, wherein the first provider data corresponds to a first provider user of the second computing device;
receiving, by the server over the data network, second provider data from the third computing device, wherein the second provider data corresponds to a second provider user of the third computing device;

receiving, by the server over the data network, third provider data from the fourth computing device, wherein the third provider data corresponds to a third provider user of the fourth computing device;

storing, by the server, the first provider data, the second provider data, and the third provider data in a second database in data communication with the processor, wherein the second database is configured to store a plurality of provider data;

receiving, by the server over the data network, provider search data from the first computing device, the provider search data including data indicating a plurality of search criteria and a ranking of the plurality of search criteria in order of importance, the plurality of search criteria including a type of a pet-related service; a future date of the pet-related service; a first price value; and a geographic area;

generating, by the server, provider search information, wherein the provider search information generated by combining a portion of the user data from the first database with the provider search data, wherein the portion of the user data includes the one or more attributes relating to the pet of the first user;

identifying, by the server, a first determination that a first portion of the plurality of provider data partially satisfies the provider search information, the first portion including provider data corresponding to the first provider data, the second provider data, and the third provider data;

in response to the first determination, identifying, by the server, a ranking of the first portion of the plurality of provider data, wherein ranking the first portion is based on one or more of the plurality of search criteria being satisfied by each of the first portion and the ranking of the plurality of search criteria in order of importance;

in response to the identified ranking, selecting from the first portion, by the server, a second portion of the plurality of provider data from the second database based on a second determination that the second portion has a top rank among the first portion, the second portion including provider data corresponding to the first provider data and the second provider data;

in response to the selection of the second portion, sending, by the server, a first prompt to the second computing device indicating a request for a second price value, and a second prompt the third computing device indicating a request for a third price value;

receiving, by the server over the data network, the second price value from the second computing device and the third price value from the third computing device;

based on a third determination that the second price value is within a predetermined range of the first price value and the third price value is outside the predetermined range of the first price value, selecting, by the server, a third portion of the plurality of provider data from the second database, the third portion including provider data corresponding to the first provider data, and sending, by the server over the data network, first search response data based on the third portion of the plurality of provider data to the first computing device; and in response to a fifth determination that a present date is within a predetermined time period of the future date of the pet-related service, sending, by the server over the data network, reminder data to the first computing device;

receiving, by the first computing device, a user input indicating that the first provider performed the pet-related service for the first user, wherein prior to the first computing device receiving the user input, the first user goes to the geographic area and the first provider performs the pet-related service for the first user;

detecting, by the first computing device in response to receiving the user input, location data;

transmitting, by the first computing device, a confirmation that the first user went to the geographic area and the first provider performed the pet-related service for the first user, the confirmation including location data identifying the geographic area;

receiving, by the server, the confirmation from the first computing device; and in response to receiving the confirmation, updating, by the server, the second database by storing the location data in the second database as being associated with the first provider.

13. The method of claim 12, wherein the first determination includes:

an identification that an offering of services of the first portion of the plurality of provider data matches the type of the pet-related service of the plurality of search criteria; and an identification that a geographic location of the first provider search data is within a distance threshold of the geographic area of the plurality of search criteria.

14. The method of claim 13, further comprising receiving, by the server over the data network, a confirmation from the first computing device that the user went to the geographic area and the first provider performed the pet-related service for the user.

15. The method of claim 14, wherein the one or more attributes relating to a pet of the first user further includes:

an age of the pet of the first user; and medical information of the pet of the first user, wherein the medical information includes a medical condition of the pet of the first user and a medical history of the pet of the first user.

16. The method of claim 15, wherein the first provider data includes a name of the first provider user and contact information of the first provider user, the second provider data includes a name of the second provider user and contact information of the second provider user, and the third provider data includes a name of the third provider user and contact information of the third provider user.

17. The method of claim 16, wherein the first provider data further includes a type of services offered by the first provider user, the second provider data further includes a type of services offered by the second provider user, and the third provider data further includes a type of services offered by the third provider user.

18. The method of claim 17, wherein the provider search data further includes data indicating a range of service ratings.

19. The method of claim 18, wherein the search response data includes data indicating the contact information of the first provider user.

20. The method of claim 19, wherein the type of the pet-related service is one of a medical procedure, pet grooming or pet sitting.

* * * * *